US010712286B1

(12) United States Patent
Fetzer et al.

(10) Patent No.: US 10,712,286 B1
(45) Date of Patent: Jul. 14, 2020

(54) SYSTEMS AND METHODS FOR NON-DESTRUCTIVE EVALUATION OF A STRUCTURE

(71) Applicant: The Boeing Company, Chicago, IL (US)

(72) Inventors: Barry A. Fetzer, Renton, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/391,901

(22) Filed: Apr. 23, 2019

(51) Int. Cl.
| | |
|---|---|
| *G01N 21/00* | (2006.01) |
| *G01N 21/88* | (2006.01) |
| *G06T 7/00* | (2017.01) |
| *G05B 23/02* | (2006.01) |
| *G07C 5/00* | (2006.01) |
| *G01N 21/01* | (2006.01) |
| *B64C 39/02* | (2006.01) |

(52) U.S. Cl.
CPC ........... *G01N 21/88* (2013.01); *B64C 39/024* (2013.01); *G01N 21/01* (2013.01); *G05B 23/024* (2013.01); *G06T 7/0002* (2013.01); *G07C 5/006* (2013.01); *B64C 2201/108* (2013.01); *B64C 2201/127* (2013.01); *G01N 2021/0106* (2013.01)

(58) Field of Classification Search
CPC ............. G01M 5/0033; G01M 5/0016; G01M 5/0008; B64D 1/22; B64D 1/02; B64C 39/024; G01N 21/88; G01N 29/043; G01N 29/041; G01N 29/11; G01N 29/2468; G01N 29/28; G01N 2201/0214

USPC ................ 356/237.1–237.5; 73/866.5, 865.8
See application file for complete search history.

(56) References Cited

U.S. PATENT DOCUMENTS

| | | | | |
|---|---|---|---|---|
| 6,115,118 A | * | 9/2000 | Dunnegan | G01N 21/958 |
| | | | | 348/128 |
| 6,262,802 B1 | * | 7/2001 | Kiyono | G01B 11/002 |
| | | | | 250/237 G |
| 6,536,553 B1 | * | 3/2003 | Scanlon | G01N 29/069 |
| | | | | 181/108 |

(Continued)

FOREIGN PATENT DOCUMENTS

GB                368698         * 9/1930

*Primary Examiner* — Hoa Q Pham
(74) *Attorney, Agent, or Firm* — McDonnell Boehnen Hulbert & Berghoff LLP

(57) ABSTRACT

In an example, a method for non-destructive evaluation of a structure is described. The method comprises identifying a portion of a surface of the structure for evaluation. The method further comprises controlling an armature to align a two-dimensional array of sensors with the portion of the surface. The method further comprises causing the two-dimensional array of sensors to engage the portion of the surface. The method further comprises, responsive to determining that the two-dimensional array of sensors has engaged with the portion of the surface, (i) releasing the two-dimensional array of sensors from the armature, and (ii) scanning, the portion of the surface to collect sensor data. The method further comprises, after scanning the portion of the surface, (i) controlling the armature to couple to the two-dimensional array of sensors, and (ii) causing the two-dimensional array of sensors to disengage with the portion of the surface.

20 Claims, 10 Drawing Sheets

(56) References Cited

U.S. PATENT DOCUMENTS

| | | | |
|---|---|---|---|
| 8,347,746 B2* | 1/2013 | Hafenrichter | G01N 29/265 |
| | | | 73/866.5 |
| 8,983,794 B1* | 3/2015 | Motzer | G01N 29/11 |
| | | | 702/150 |
| 9,689,844 B2 | 6/2017 | Holmes et al. | |
| 9,915,633 B2 | 3/2018 | Georgeson et al. | |
| 10,209,233 B2 | 2/2019 | Dean et al. | |
| 2006/0043303 A1* | 3/2006 | Safai | G01N 21/9515 |
| | | | 250/347 |
| 2015/0367586 A1 | 12/2015 | Georgeson et al. | |
| 2017/0073071 A1* | 3/2017 | Salzmann | B64D 1/22 |
| 2018/0120196 A1 | 5/2018 | Georgeson et al. | |
| 2019/0094149 A1* | 3/2019 | Troy | G01M 5/0008 |

* cited by examiner

SYSTEMS AND METHODS FOR NON-DESTRUCTIVE EVALUATION OF A STRUCTURE

FIELD

The present disclosure relates generally to operation of two-dimensional arrays of sensors, and more particularly, to methods and systems for using a two-dimensional array of sensors for non-destructive evaluation of a structure for damage.

BACKGROUND

A structure, such as an aircraft or an airplane, may sustain damage based on impact from an object, due to stresses experienced during operation, from lightning strikes, or from normal wear and tear. Detecting damage to the structure allows for maintenance to be performed that extends the functional lifespan of the structure. Thus, performing regular inspections on a structure for damage are necessary.

Existing systems and methods for inspecting a structure involve inspecting the entirety of, or a large portion of, the structure at regular intervals, or in response to known damage. However, using sensors to scan the entirety of a structure can be time-consuming, costly, and inefficient. Further, many structures are relatively high above ground level or irregularly shaped, making installation of sensor equipment to inspect for damage impractical.

What is needed is a system for performing targeted evaluation of a structure for damage.

SUMMARY

In an example, a method for non-destructive evaluation of a structure is described. The method comprises identifying a portion of a surface of the structure for evaluation. The method further comprises controlling, by a computing device, an armature to align a two-dimensional array of sensors with the portion of the surface. The method further comprises causing the two-dimensional array of sensors to engage the portion of the surface. The method further comprises, responsive to determining that the two-dimensional array of sensors has engaged with the portion of the surface, (i) releasing, by the computing device, the two-dimensional array of sensors from the armature, and (ii) scanning, by two-dimensional array of sensors, the portion of the surface to collect sensor data. The method further comprises, after scanning the portion of the surface, (i) controlling, by the computing device, the armature to couple to the two-dimensional array of sensors, and (ii) causing the two-dimensional array of sensors to disengage with the portion of the surface.

In another example, a system for non-destructive evaluation of a structure is described. The system comprises armature. The system further comprises a two-dimensional array of sensors. The system further comprises a computing device having a processor and memory storing instructions executable by the processor to identify a portion of a surface of the structure for evaluation. The instructions are further executable by the processor to control an armature to align a two-dimensional array of sensors with the portion of the surface. The instructions are further executable by the processor to cause the two-dimensional array of sensors to engage the portion of the surface. The instructions are further executable by the processor to, responsive to determining that the two-dimensional array of sensors has engaged with the portion of the surface, (i) release the two-dimensional array of sensors from the armature, and (ii) cause the two-dimensional array of sensors to scan the portion of the surface to collect sensor data. The instructions are further executable by the processor to, after causing the two-dimensional array of sensors to scan the portion of the surface, (i) control the armature to couple to the two-dimensional array of sensors, and (ii) cause the two-dimensional array of sensors to disengage with the portion of the surface.

In another example, a non-transitory computer readable medium having stored thereon instructions, that when executed by one or more processors of a computing device, cause the computing device to perform functions as described. The functions comprise identifying a portion of a surface of a structure for evaluation. The functions further comprise controlling an armature to align a two-dimensional array of sensors with the portion of the surface. The functions further comprise causing the two-dimensional array of sensors to engage the portion of the surface. The functions further comprise responsive to determining that the two-dimensional array of sensors has engaged with the portion of the surface, (i) releasing the two-dimensional array of sensors from the armature, and (ii) causing the two-dimensional array of sensors to scan the portion of the surface to collect sensor data. The functions further comprise, after causing the two-dimensional array of sensors to scan the portion of the surface, (i) controlling the armature to couple to the two-dimensional array of sensors, and (ii) causing the two-dimensional array of sensors to disengage with the portion of the surface.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
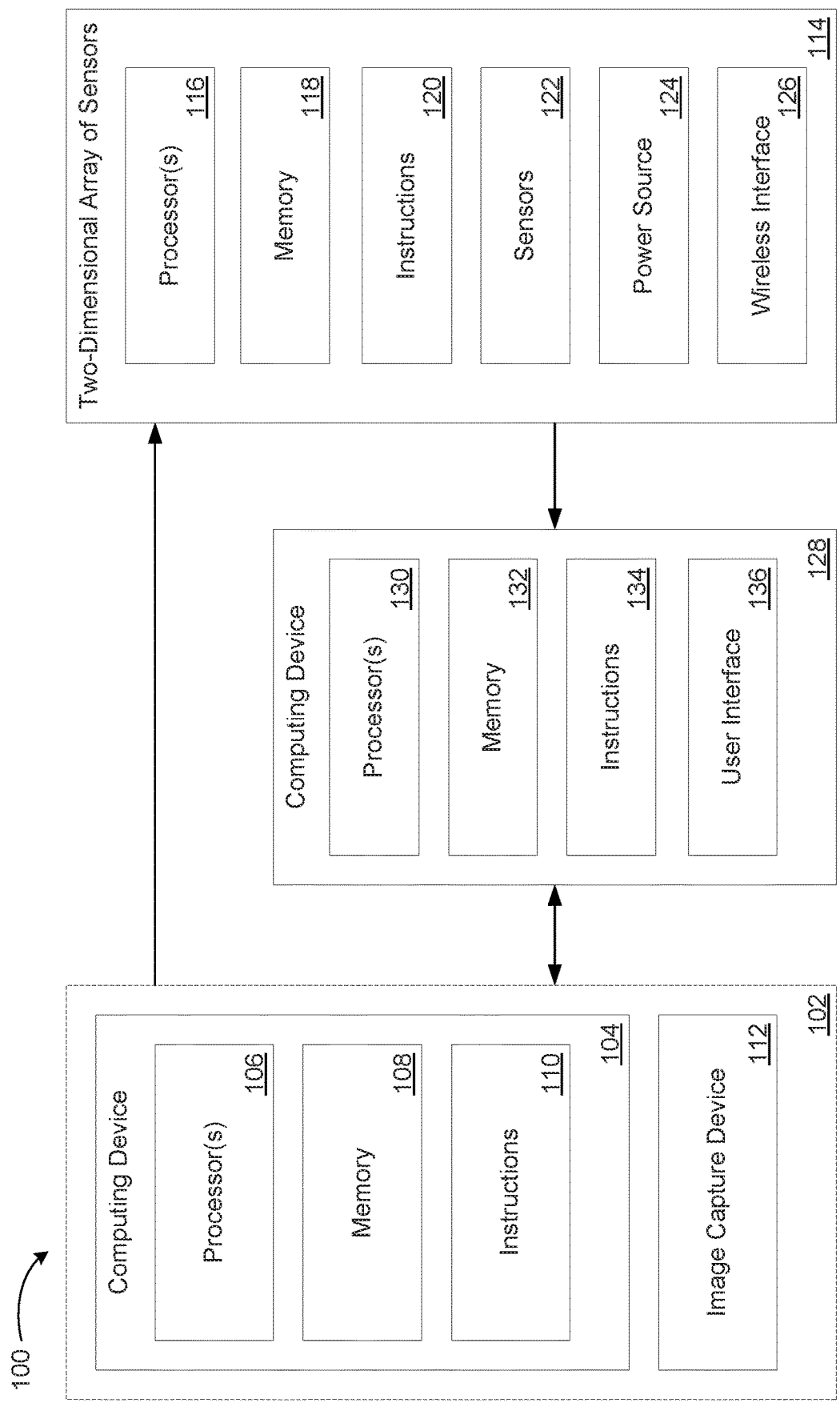
FIG. 1 illustrates a block diagram of a system for non-destructive evaluation of a structure, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for local damage inspection of a structure are described. More specifically, systems and methods for non-destructive evaluation of a structure using a two-dimensional array of sensors are described. Such inspection involves identifying a portion of a surface of the structure for evaluation. An armature is controlled to align the two dimensional array of sensors with the identified portion of the surface. The two-dimensional array of sensors engages with the portion of the surface, and scans the portion of the surface. The armature releases the two-dimensional array of sensors prior to the two-dimensional array scanning the portion of the surface, and engages with the two-dimensional array of sensors after the portion of the surface is scanned. The two-dimensional array of sensors is configured to transmit a representation of the scan to a remote computing device that evaluates the representation of the scan to determine whether a portion of the surface of the structure is damaged. Using an array of sensors to inspect the surface of the structure for damage allows for non-destructive, targeted, and efficient evaluation of the structure.

Within examples, the armature is attached to a system controlled by a computing device, referred to herein as an armature control system. For example, the armature may be attached to a free-standing robotic structure. In other examples, the armature may be attached to a land vehicle. In still other examples, the armature may be attached to an unmanned aerial vehicle (UAV).

Example systems and methods involve efficiently evaluating a selected portion of a structure, such as an aircraft. In one example, a UAV may use an image capture device to inspect a surface of the aircraft to identify a portion of the aircraft for evaluation. For example, the image capture device may capture an image that shows a portion of the surface that is discolored, misshapen, scratched, blemished, or otherwise provide an indication of surface-level or sub-surface damage. A computing device controlling the UAV may automatically select the portion of the surface for inspection, or may transmit images to a remote computing device and receive an indication from the remote computing device of the portion of the surface for inspection.

Within examples, the UAV includes a fulcrum and a counterweight that are used to control the armature while still allowing the UAV to remain steady. The UAV, or a computing device associated with the UAV, may control the armature to align with the portion of the surface of the structure, and release the two-dimensional array of sensors once the two-dimensional array has engaged with the portion of the surface.

Within examples, the two-dimensional array of sensors may be configured to perform a single scan of the portion of the surface, and send a representation of the scan to a computing device to quickly and efficiently evaluate an area of interest on the structure, without scanning an entire section of the structure. Further, by using the two-dimensional array of sensors to the portion of the surface, damage below the surface of the structure can be evaluated non-invasively and non-destructively (i.e. without damaging the structure itself). The armature may thereafter retrieve the two-dimensional array of sensors to inspect other portions of the structure. Within examples, the two-dimensional array of sensors is modular, and includes different sensor types that correspond to different types of evaluation. A computing device selects a particular two-dimensional array of sensors based on a potential type of damage experienced by the portion of the structure. Then the particular two-dimensional array of sensors to scans the portion of the structure. This allows for robust, quick, and adaptive evaluation of a structure, without using several different devices to evaluate the structure.

Turning now to the figures, FIG. 1 illustrates a block diagram of a system 100 for non-destructive evaluation of a structure, according to an example implementation. The system 100 includes an armature control system 102, which in turn includes a computing device 104, and an image capture device 112. The computing device 104 includes processor(s) 106, memory 108, and instructions 110.

The one or more processor(s) 106 may be general-purpose processors or special purpose processors (e.g., digital signal processors, application specific integrated circuits, etc.). The one or more processor(s) 106 can be configured to execute the instructions 110 (e.g., computer-readable program instructions) that are stored in the memory 108 and are executable to provide the functionality of computing device 104, and related systems and methods described herein.

The memory 108 may include or take the form of one or more computer-readable storage media that can be read or accessed by the processor(s) 106. The computer-readable storage media can include volatile and/or non-volatile storage components, such as optical, magnetic, organic or other memory or disc storage, which can be integrated in whole or in part with the processor(s) 106. The memory 108 is considered non-transitory computer readable media. In some examples, the memory 108 can be implemented using a single physical device (e.g., one optical, magnetic, organic or other memory or disc storage unit), while in other examples, the memory 108 can be implemented using two or more physical devices. The memory 108 thus is a non-transitory computer readable storage medium, and instructions 110 executable by the processor(s) 106 are stored on the memory 108. The instructions 110 include computer executable code.

The image capture device 112 may include one or more of a camera, a Light Detection and Ranging (LIDAR) device, or another device capable of providing a visual representation of a scene.

The system 100 further includes a two-dimensional array of sensors 114. The two-dimensional array of sensors includes processor(s) 116, memory 118, instructions 120, sensors 122, a power source 124, and a wireless interface 126. The processor(s) 116 may be configured in substantially the same manner as described above with respect to the processor(s) 106. The memory 118 may be configured in substantially the same manner as described above with respect to the memory 108. The instructions 120 may be configured in substantially the same manner as described above with respect to the instructions 110.

The two-dimensional array of sensors 114 may be connected to an armature of the armature control system 102. The instructions 120 are executed by the processor(s) 116 to engage the two-dimensional array of sensors 114 with a surface of a structure. The instructions 110 are further executed by the processor(s) 116 to use the sensors 122 to scan the portion of the surface of the structure once the two-dimensional array of sensors 114 has engaged with the surface of the structure. The sensors 122 may include several sensors of the same type, or multiple types of sensors. For example, the sensors 122 may be configured to perform at least one of an ultrasound, eddy current, thermography, low frequency sound, or another type of scan of the surface of the structure. Performing a scan using the sensors 122 may allow the two-dimensional array of sensors 114 to obtain sensor data representing the portion of the structure, and to send the sensor data to a computing device.

The two-dimensional array of sensors 114 further includes a power source 124 and a wireless interface 126. The power source 124 can include a battery or another device configured to store electrical energy, or a wired connection to an outside power source, such as a power source of the armature control system 102. The wireless interface 126 may, for example, include an antenna configured to wirelessly transmit signals one or more computing devices.

The system 100 further includes a remote computing device 128. The remote computing device 128 includes processor(s) 130, a memory 132, instructions 134, and a user interface 136. The processor(s) 130 may be configured in substantially the same manner as described above with respect to the processor(s) 106. The memory 132 may be configured in substantially the same manner as described above with respect to the memory 108. The instructions 134 may be configured in substantially the same manner as described above with respect to the instructions 110.

The user interface 136 may include a touchscreen, mouse, or another mechanism for selecting a visual representation of a portion of a structure. Further, the user interface 136 may include a keyboard or another mechanism for entering information. Further, the user interface 136 may include one or more selectable buttons that provide options for providing instructions to the armature control system 102. For example, the remote computing device 128 may receive, from the computing device 104, a representation of an image of the structure captured by the image capture device 112 of the armature control system 102. The user interface 136 may display a visual representation of the image. The user interface 136 may facilitate interaction with the visual representation of the image, such as by allowing selection of a portion of the image that corresponds to a portion of the structure. The user interface 136 may further facilitate user instructions regarding the selected portion of the image, such as providing a selectable button that corresponds to a command to inspect that portion of the structure using the two-dimensional array of sensors 114, and perhaps providing selectable buttons specifying a type of sensor to use when scanning the portion of the structure. In this fashion, the armature control system 102 may receive user feedback concurrently with performing a visual scan of a structure using the image capture device 112, and quickly scan portions of the structure selected by the user by way of the user interface 136.

In other examples, user feedback might not be used when determining which portions of the structure to inspect and evaluate. For example, the computing device 104 may automatically identify portions of the structure for evaluation based on an image captured by the image capture device 112. In other examples, the computing device 104 of the armature control system 102 may receive a maintenance schedule associated with the structure. For instance, the schedule may specify times when particular components of the structure are scheduled for evaluation. The computing device 104 of the armature control system 102 may determine that a portion of the surface of the structure corresponds to a particular component of the structure that is scheduled for maintenance, and may control the armature to align the two-dimensional array of sensors 114 with the portion of the structure.

In another example, the computing device 104 of the armature control system 102 may receive an operational report associated with the structure. The operational report may specify that one or more components of the structure were impacted by an object. The computing device 104 of the armature control system 102 may determine a portion of the surface of the structure that corresponds to the particular component of the structure, and responsively control the armature to align the two-dimensional array of sensors 114 with the portion of the structure and to scan that portion of the structure.

Within examples described herein, the armature control system 102 may include an unmanned aerial vehicle (UAV). In such examples, identifying a portion of the surface of the structure for evaluation can involve causing the UAV to scan the surface of the aircraft for potential damage using the image capture device 112. The computing device 104 of the armature control system 102 can receive an image captured by the image capture device 112 and automatically recognize a portion of the surface for inspection. In other examples, the computing device 104 of the armature control system 102 can receive, by way of the user interface 136 of the remote computing device 128, an indication of a portion of the image corresponding to identifying the portion of the surface of the aircraft for evaluation.

Further details of the armature control system 102, and embodiments in which the armature control system 102 includes a UAV, are described below.

Figure 2:
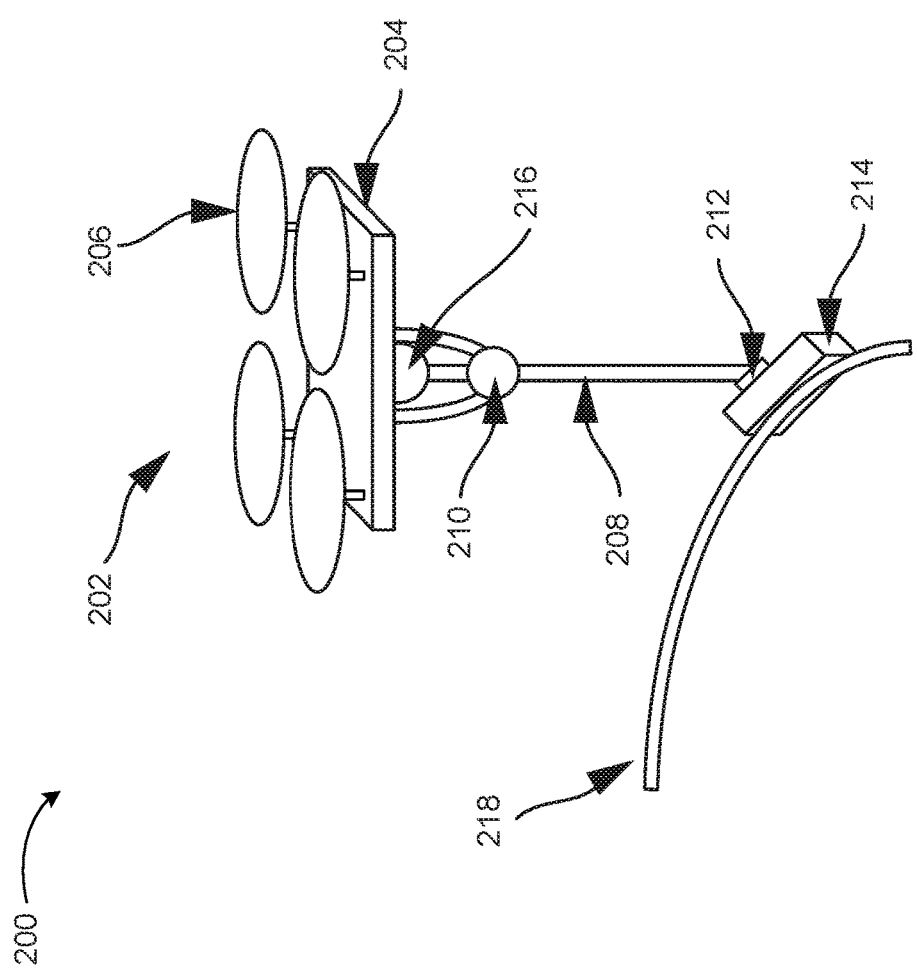
FIG. 2 illustrates a system for non-destructive evaluation of a structure, according to an example implementation.

FIG. 2 illustrates a system 200 for non-destructive evaluation of a structure, according to an example implementation. The system 200 includes a UAV 202, which in turn includes a fuselage 204, and rotors 206. Though not depicted in FIG. 2, the UAV 202 may further include processor(s), memory, and instructions stored in the memory and executable by the processor(s) to perform functions. The fuselage 204 is connected to an armature 208, a fulcrum 210, a coupling mechanism 212, and a counterweight 216. The system 200 further includes a two-dimensional array of sensors 214, which is coupled to the armature 208 by way of the coupling mechanism 212. For purposes of this example, the UAV 202, the armature 208, the fulcrum 210, the coupling mechanism 212, and the counterweight 216 all are components of an armature control system, such as armature control system 102.

The system 200 further includes a surface 218 of a structure. FIG. 2 illustrates the UAV 202, the armature 208, and the coupling mechanism aligning the two-dimensional sensor with a portion of the surface 218. The armature 208 includes a length and connects to the fulcrum 210 at a fulcrum point along the length. The armature 208 further includes a coupling mechanism at a first end of the armature 208 that connects to the two-dimensional array of sensors 214 and a counterweight 216 at a second end of the armature 208. The counterweight 216 is a known weight and the two-dimensional array of sensors has known array weight. Controlling the armature to align the two-dimensional array of sensor 214 with the portion of the surface 218 involves controlling the armature 208 taking one or more of these aspects of the armature 208 and the two-dimensional array of sensors 214 into account. Specifically, controlling the armature can be based on the armature length, fulcrum point, counterweight, and array weight. Controlling the armature based on these factors may prevent the UAV 202 from substantially pitching or rolling when aligning the two-dimensional array of sensors with the portion of the surface of the structure.

Within examples, controlling the armature can involve moving the armature 208 by changing a position of the UAV 202, changing an angle of the armature 208 relative to the fulcrum 210, changing the fulcrum point such that a different point along the length of the armature 208 contacts the fulcrum 210, and changing an angle of the coupling mechanism 212 relative to the armature 208. Changing the angle of the armature 208 relative to the fulcrum 210 may be accomplished using a motor at the fulcrum 210, a motorized or hydraulic shortening/extending arm placed between the fulcrum 210 and armature 208, or by another rotational mechanism. In alternative examples, changing the angle of the armature 208 relative to the fulcrum 210 can be accomplished with a wind diverter coupled to armature 208 that moves up or down the length of the armature 208 and changes angle relative to the armature to use downdraft from the rotors 206 to push one end of the armature 208 downward. In these examples, the downdraft could also change the position of the fulcrum point using a wind-driven spool of wire that attaches to the fulcrum 210 and to the wind diverter. In this manner, the wind diverter may divert a downdraft to change the fulcrum point such that a different point along the length of the armature 208 contacts the fulcrum 210. Changing the fulcrum point such that a different point along the length of the armature 208 contacts the fulcrum 210 can alternatively be accomplished using a motor at the fulcrum 210, a pneumatic interaction between the fulcrum 210 and the armature 208, or another mechanism for moving the armature 208 relative to the fulcrum 210 along an axis coaxial to the length of the armature 208. Changing an angle of the coupling mechanism 212 relative to the armature may involve using a motor at the coupling mechanism 212 or another mechanism for rotating the coupling mechanism 212.

Figure 3B:
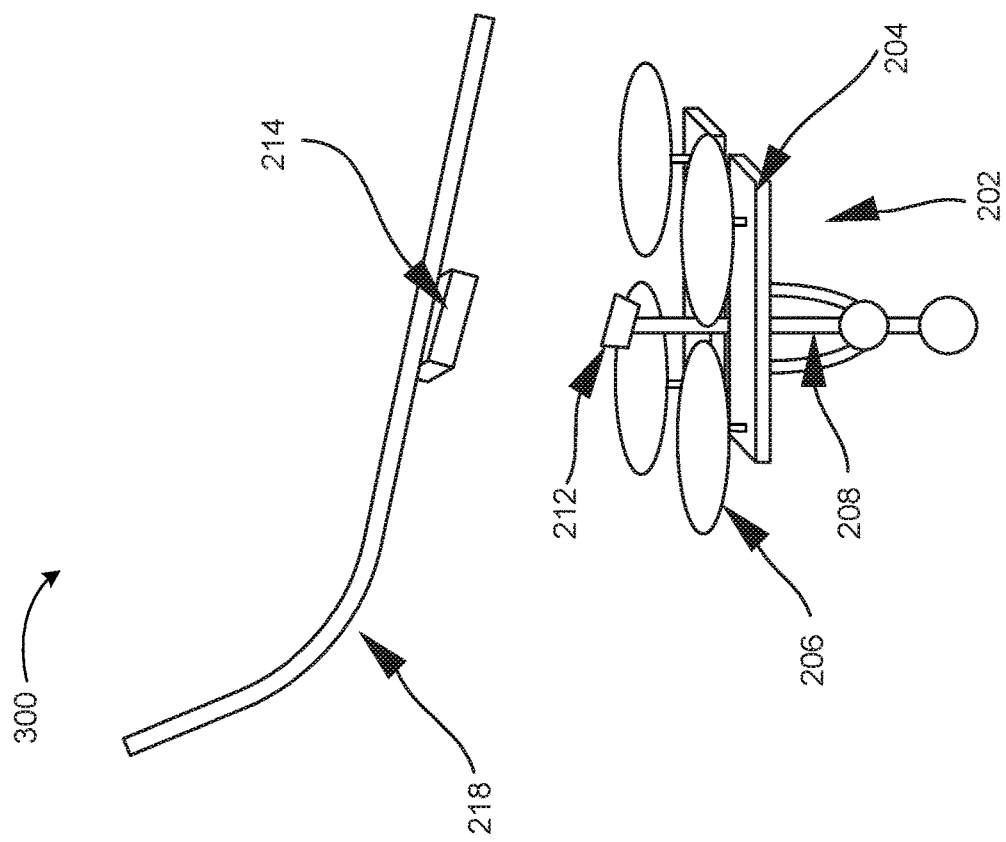
FIG. 3B illustrates another system for non-destructive evaluation of a structure, according to an example implementation.
Figure 3A:
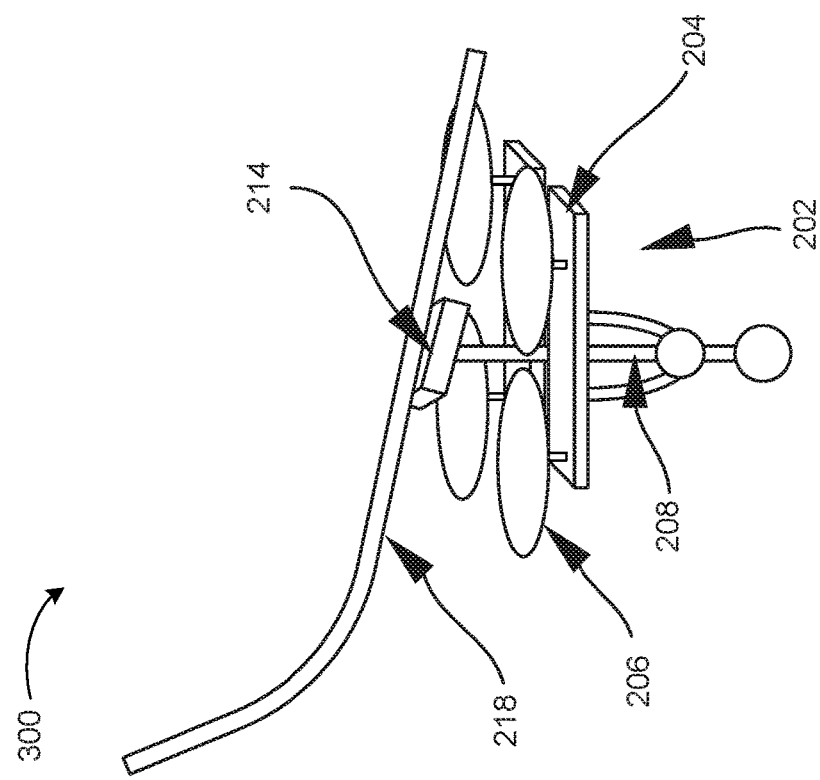
FIG. 3A illustrates another system for non-destructive evaluation of a structure, according to an example implementation.

FIG. 3A illustrates another system 300 for non-destructive evaluation of a structure, according to an example implementation. In particular, FIG. 3A depicts an example of a UAV 202 aligning a two-dimensional array of sensors 214 with a portion of a surface 218 of a structure. The UAV 202 includes a fuselage 204, rotors 206, and an armature 208. In the present example, the two-dimensional array of sensors 214 is depicted as being oriented above the rotors 206 to attach to a bottom portion of the surface 218 of the structure. Further details related to orienting the armature 208 above the rotors 206 are provided below.

In an example scenario, a computing device associated with the UAV 202, such as the computing device 104, receives an instruction from a computing device, such as the remote computing device 128, to inspect the structure for potential damage. In this example scenario, the structure is an aircraft. The computing device 104 controls the UAV 202 to pass over the surface 218 of the aircraft and to obtain a plurality of images of the surface 218 from an image capture device coupled to the UAV 202 (for purposes of simplicity, the image capture device is not depicted in FIG. 3A). The image capture device may be the same or similar to the image capture device 112.

In the example scenario, the computing device 104 may determine, from an image of the plurality of images, that a portion of the surface 218 should be scanned by the two-dimensional array of sensors 214. For example, the computing device 104 may send indications of the plurality of images to the remote computing device 128 and receive an instruction to inspect a particular portion of the surface 218. In other examples, the computing device 104 may automatically recognize signs of damage to the structure based on a feature of the image, such as a visual indication from the surface 218 as represented by the image. For example, the memory 108 of the computing device 104 may store indications of surface-level or sub-surface damage to the structure, such as known discolorations, shapes, scratches, blemishes, or other indications of surface-level or sub-surface damage. The computing device 104 may determine that a portion of the surface 218 should be inspected based on (i) comparing a portion of an image to the stored indications of surface-level or sub-surface damage to the structure, and (ii) determining potential damage to the structure by matching the portion of the image to a stored indication of surface-level or sub-surface damage to the structure. In some examples, the stored indications of surface-level or sub-surface damage to the structure may differ based on the type of structure. Accordingly, the computing device 104 may determine that a portion of the surface 218 should be scanned by the two-dimensional array of sensors 214 differently based on the type of structure being inspected.

Further, the computing device 104 may determine a type of sensor to use when scanning the surface 218 of the structure. For example, the computing device 104 may determine a potential damage type of the structure based on a feature of an image received from the image capture device. For example, a particular pattern of discoloration on the surface 218 of the structure may indicate that the structure has been impacted by an object, and may be associated with sub-surface damage. Accordingly, the computing device 104 may select a two-dimensional array of sensors 214 corresponding to that potential damage type.

For example, the computing device 104 may select a two-dimensional array of ultrasound sensors. In such examples, the two-dimensional array of sensors 214 can be one of a plurality of modular two-dimensional arrays of sensors that include different sensor types. For example, the plurality of modular two-dimensional arrays of sensors can include an array of ultrasound sensors, an array of eddy current sensors, an array of thermography sensors, an array of low frequency sound sensors, and other sensors, each of which may be associated with a different potential damage type of the structure.

Within examples, the image capture device 112 may include more than one type of camera. For instance, the image capture device 112 may include a first camera configured for capturing images in the visible spectrum and a second camera configured for capturing images outside of the visible spectrum (e.g. an infrared (IR) camera). Within such examples, a first image of the surface 218 of the structure (e.g. in the visible spectrum) from the first camera might not indicate damage to the structure, but a second image of the surface 218 of the structure (e.g. in the IR spectrum) from a second camera might indicate damage to the structure, or vice versa. The computing device 104 might determine a potential type of damage based at least in part on what type of image capture device captured an image. For instance, damage detected from an IR image may indicate sub-surface damage, while damage detected from a visible spectrum image may indicate surface-level damage.

Turning back to the example scenario, having identified a portion of a surface of the structure for evaluation, the computing device 104 controls the UAV 202 and the armature 208 to align the two-dimensional array of sensors with the portion of the surface 218 of the structure. This may include adjusting a position of the UAV 202, rotating the armature 208, adjusting the fulcrum point of the armature 208, and rotating the coupling mechanism (not shown in FIG. 3A). The computing device 104 causes the two-dimensional array of sensors 214 to engage the portion of the surface 218 of the structure. Causing this may be performed by instructing the two-dimensional array of sensors 214 to engage with the surface 218, or by causing the armature 208 to press the two-dimensional array of sensors 214 on the surface 218, whereby the two-dimensional array of sensors 214 automatically engages the surface 218. For example, the two-dimensional array of sensors 214 can include feet that engage the surface 218 of the structure through suction, magnetism, electrostatic force, adhesives, friction, or another non-destructive means of temporarily coupling the two-dimensional array of sensors 214 to the surface 218 of the structure.

FIG. 3B is another simplified illustration of the system 300 for non-destructive evaluation of a structure, according to an example implementation. In particular, FIG. 3B depicts an example of the UAV 202 having released the two-dimensional array of sensors 214 from the armature 208. For purposes of this description, FIGS. 3A and 3B can be understood to be temporally related. For example, FIG. 3A depicts the system 300 at a first time, and FIG. 3B depicts the system 300 at a second time that is later than the first time. After the two-dimensional array of sensors 214 engages the surface 218, the coupling mechanism 212 of the armature 208 releases the two-dimensional array of sensors 214 while the two-dimensional array of sensors performs a scan of the portion of the surface 218 of the structure. One or more sensors on the two-dimensional array of sensors 214 may indicate when the two-dimensional array of sensors 214 has engaged the surface 218 of the structure. For example, pressure sensors on one or more feet of the two-dimensional array of sensors may determine a normal force between the one or more feet and the surface 218 that is indicative of the two-dimensional array of sensors 214 having engaged surface 218. The computing device 104 may cause the coupling mechanism 212 of the armature 208 to release the two-dimensional array of sensors 214 upon receiving an indication from the two-dimensional array of sensors 214 that the two-dimensional array of sensors 214 has engaged the surface 218.

Returning to the example scenario described above with respect to FIG. 3A, once the two-dimensional array of sensors 214 engages the surface 218, the armature 208 releases the two-dimensional array of sensors 214 and the two-dimensional array of sensors 214 scans the portion of the surface 218 to collect sensor data. For example, the two-dimensional array of sensors 214 may obtain a single set of sensor data from the scan. After obtaining the single set of data, the two-dimensional array of sensors 214 wirelessly sends the sensor data to the remote computing device 128 using a wireless interface, such as the wireless interface 126. By only performing a single scan, the two-dimensional array of sensors 214 can be configured for low power usage and limit the size and weight of components used to facilitate a scan. In other examples, the two-dimensional array of sensors 214 may obtain several sets of sensor data for the same portion of the surface 218 of the structure. For example, in some instances the two-dimensional array of sensors 214 may obtain data over an extended period of time.

After the two-dimensional array of sensors 214 scans the surface 218 of the structure to obtains the sensor data, the computing device 104 controls the armature 208 to couple to the two-dimensional array of sensors 214. For example, the computing device 104 can guide the armature 208 to the two-dimensional array of sensors 214 based on a beacon signal transmitted by the two-dimensional array of sensors 214 indicating that the scan is complete, or based on images of the two-dimensional array of sensors 214 on the surface 218 captured by the image capture device 112. In other examples, the computing device 104 may control the armature 208 to retrieve the two-dimensional array of sensors 214 based on a time difference between the armature releasing the two-dimensional array of sensors 214 and a current time being greater than a threshold time. In such examples, the threshold time may be a known time (e.g. 10 seconds) associated with the two-dimensional array of sensors 214 performing a single scan of the portion of the surface 218 of the structure. In other examples, the threshold time may be predetermined based on an evaluation schedule of the structure that sets predetermined times for inspecting each of a plurality of portions of the surface 218 of the structure. For instance, a portion of the surface 218 can be monitored over the an extended period of time, such as hours or days, in accordance with the evaluation schedule and the two-dimensional array of sensors 214 may periodically scan the portion of the surface 218 over that period. In this manner, the two-dimensional array of sensors 214 can determine changes to the portion of the surface 218 over time.

The remote computing device 128 receives the sensor data, or a representation of the sensor data, from the two-dimensional array of sensors 214, and evaluates an extent of damage to the structure based on the received sensor data. For example, the remote computing device 128 can determine an extent of damage to the structure based on the sensor data differing from expected data, wherein the expected data corresponds to the portion of the structure having little or no damage. Within examples, if the sensor data differs from the expected data by a threshold amount (e.g. having a correlation of less than 0.8), then the remote computing device 128 may determine that maintenance should be performed on the portion of the structure, such as by replacing a component of the structure or repairing the damage to the structure.

Figure 3C:
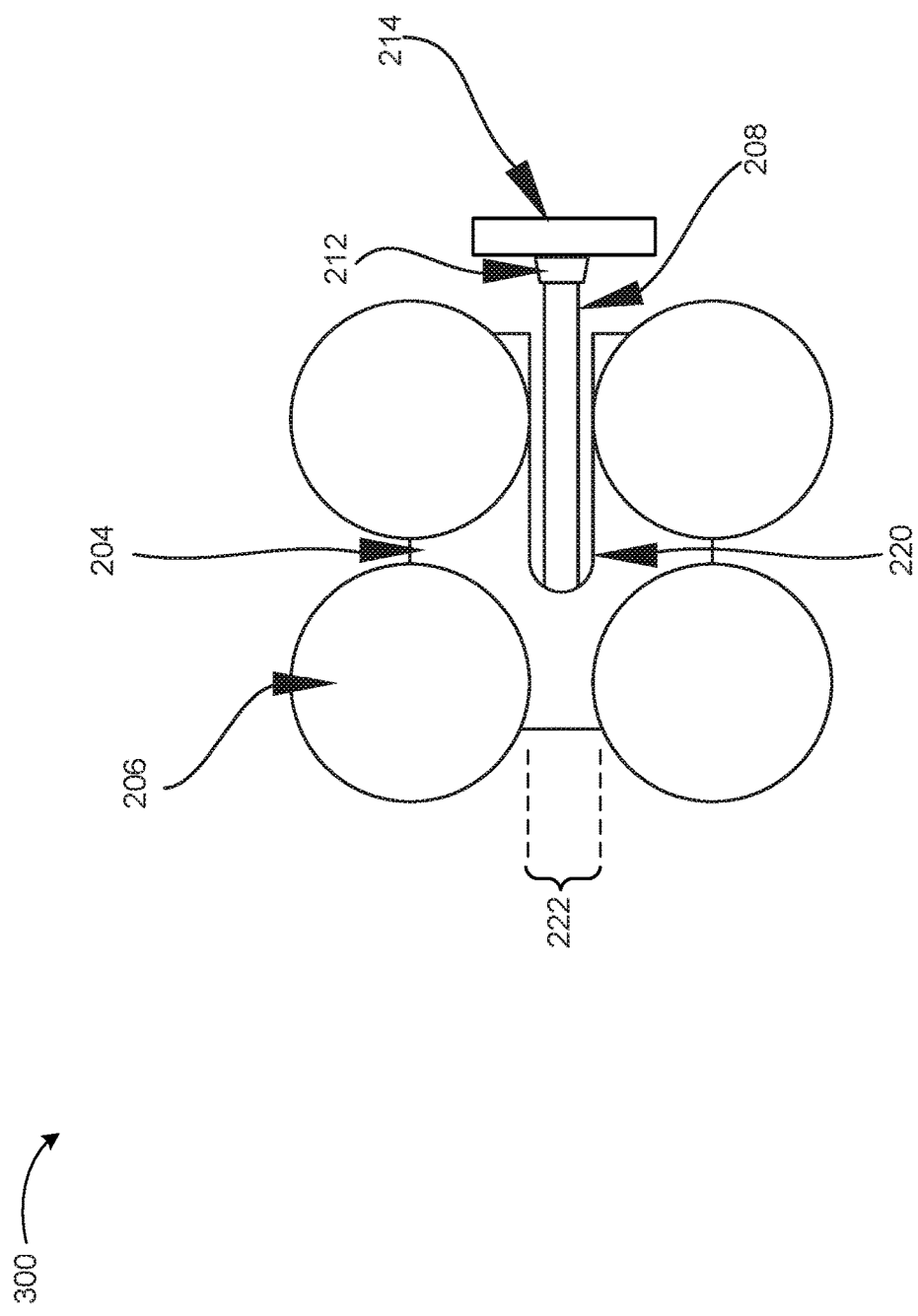
FIG. 3C illustrates a top view of another system for non-destructive evaluation of a structure, according to an example implementation.

FIG. 3C illustrates a top view of another system for non-destructive evaluation of a structure, according to an example implementation. In particular, FIG. 3C depicts the fuselage 204 of the UAV 202 having a slot 220 that allows the two-dimensional array of sensors 214 to pass above the fuselage 204 and the rotors 206. The slot 220 has a width 222 that is wider than a diameter of the armature 208. Further, a rotor distance separates an outer portion (e.g. an outer edge) of a first rotor of the rotors 206 and an outer portion of a second rotor of the rotors 206, and the rotor distance is wider than a diameter of the armature. In this fashion, the armature 208 can be oriented to pass through the slot and between the first rotor and the second rotor so that the fuselage 204 and the rotor 206 are disposed below the two-dimensional array of sensors 214. In such examples, the armature 208 may have an armature length that allows the two-dimensional array of sensors 214 to pass over the rotors 206 without contacting the rotors 206. Thus, the armature length might be based on a total diameter of the rotors 206 and a total height difference between the rotors 206 and the fulcrum of the armature 208. Including the slot 220 in the fuselage 204 allows the UAV 202 to place the two-dimensional array of sensors 214 on the underside of a structure and to retrieve the two-dimensional array of sensors 214 from the underside of the structure, as depicted in FIGS. 3A and 3B.

Figure 4B:
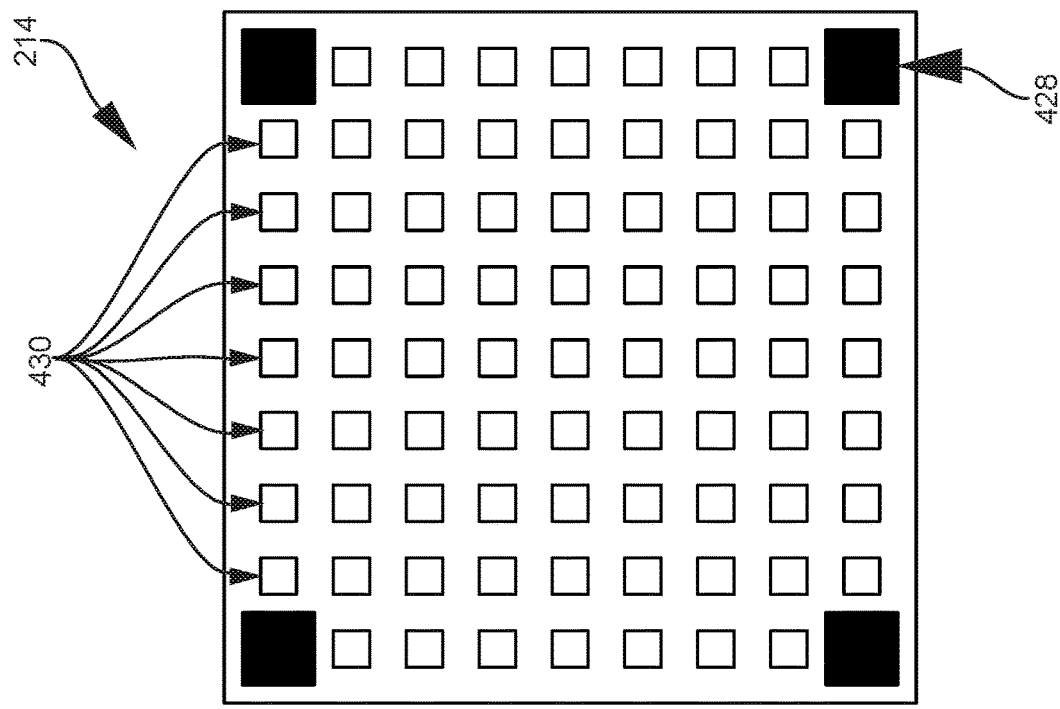
FIG. 4B illustrates a simplified bottom view of a two-dimensional array of sensors, according to an example implementation.
Figure 4A:
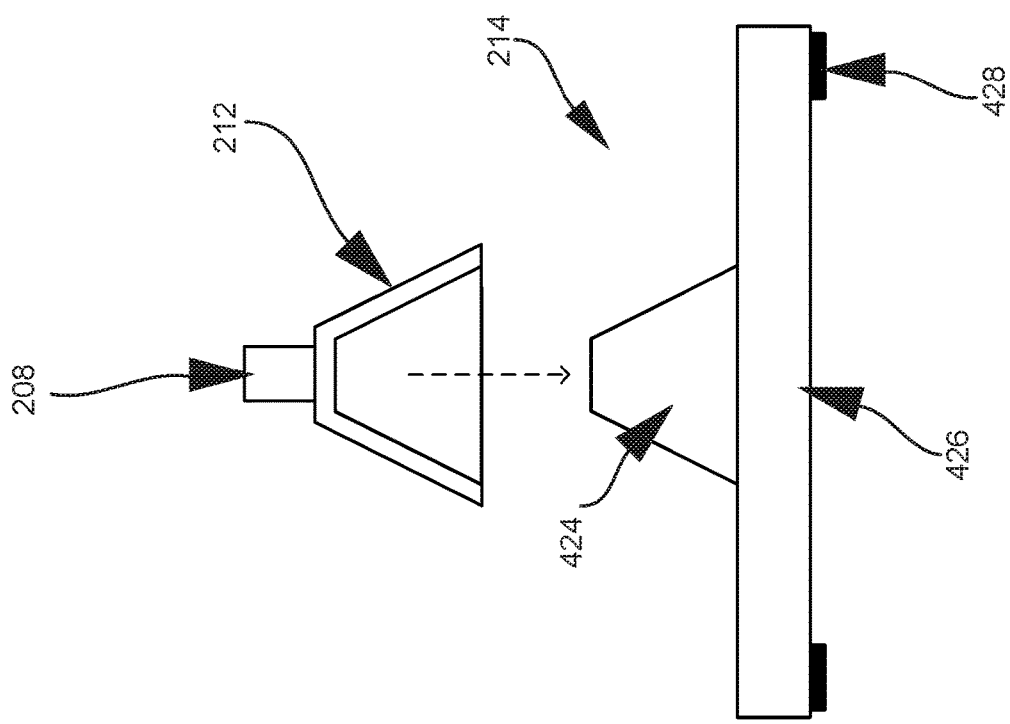
FIG. 4A illustrates a simplified cross-sectional side view of a two-dimensional array of sensors, according to an example implementation.

FIG. 4A illustrates a simplified cross-sectional side view of a two-dimensional array of sensors 214, according to an example implementation. The two-dimensional array of sensors 214 includes a dorsal portion 424, a sensor portion 426, and a plurality of feet 428. The dorsal portion 424 is disposed above the sensor portion 426, and the plurality of feet 428 are disposed below the sensor portion 426.

FIG. 4A also depicts a simplified cross-sectional view of a coupling mechanism 412 attached to a first end of an armature 408. The dorsal portion 424 of the two-dimensional array of sensors 214 and the coupling mechanism 412 may form a male-to-female connection that connects the two-dimensional array of sensors 214 to the armature 408. As depicted in FIG. 4A, the dorsal portion 424 of the two-dimensional array of sensors 214 is a male component of the male-to-female connection and the coupling mechanism 412. Within examples, one or more of the dorsal portion 424 of the two-dimensional array of sensors 214 and the coupling mechanism 412 may include a coupling sensor configured to detect whether the dorsal portion 424 of the two-dimensional array of sensors 214 and the coupling mechanism 412 are coupled. Within examples, the coupling mechanism 412 may be a vacuum-controlled mechanism that couples the dorsal portion 424 of the two-dimensional array of sensors 214 to the coupling mechanism 412 via suction, a magnetically-controlled mechanism that couples to dorsal portion 424 of the two-dimensional array of sensors 214 to the coupling mechanism 412 via magnetism, a mechanically-controlled mechanism that physically connects the dorsal portion 424 of the two-dimensional array of sensors 214 to the coupling mechanism 412, or another type of coupling device.

Within examples the computing device 104 or the two-dimensional array of sensors 214 may determine a coupling status of the dorsal portion 424 of the two-dimensional array of sensors 214 and the coupling mechanism 412. For example, in some examples, the two-dimensional array of sensors 214 may detach itself from the armature 408 based on determining that it has engaged with the surface 218 of the structure, and the computing device 104 may determine that the two-dimensional array of sensors has engaged with the portion of the surface 218 based on detecting, by the coupling sensor, that the male component (i.e. the dorsal portion 424 of the two-dimensional array of sensors 214) is not coupled to the female component (i.e. the coupling mechanism 412).

FIG. 4B illustrates a simplified bottom view of a two-dimensional array of sensors 214, according to an example implementation. In particular, FIG. 4B shows the feet 428 and sensors 430 of the two dimensional array of sensors 414. When the two-dimensional array of sensors 214 is engaged with the surface 218 of the structure, the sensors 430 are proximate to the portion of the surface 218 of the structure. Scanning the portion of the surface 218 may include causing each sensor of the sensors 430 to obtain sensor data.

In some examples, the two-dimensional array of sensors 214 may include a coupling medium between the sensors 430 and the surface 218 of the structure to facilitate data acquisition from the surface 218 of the structure. For example, if the two-dimensional array of sensors 214 includes ultrasonic sensors, water, gel, rubber, or another coupling medium can be used. If the two-dimensional array of sensors 214 includes eddy current sensors, no coupling medium is necessarily included.

Though the example scenario described above with respect to FIGS. 3A, 3B, 3C, 4A, and 4B involves using a UAV 202 to control the armature 208, a free-standing robotic system, a land vehicle, or another type of armature control system can be used to control the armature 208 and to interact with the remote computing device 128 and the two-dimensional array of sensors 214.

Figure 5:
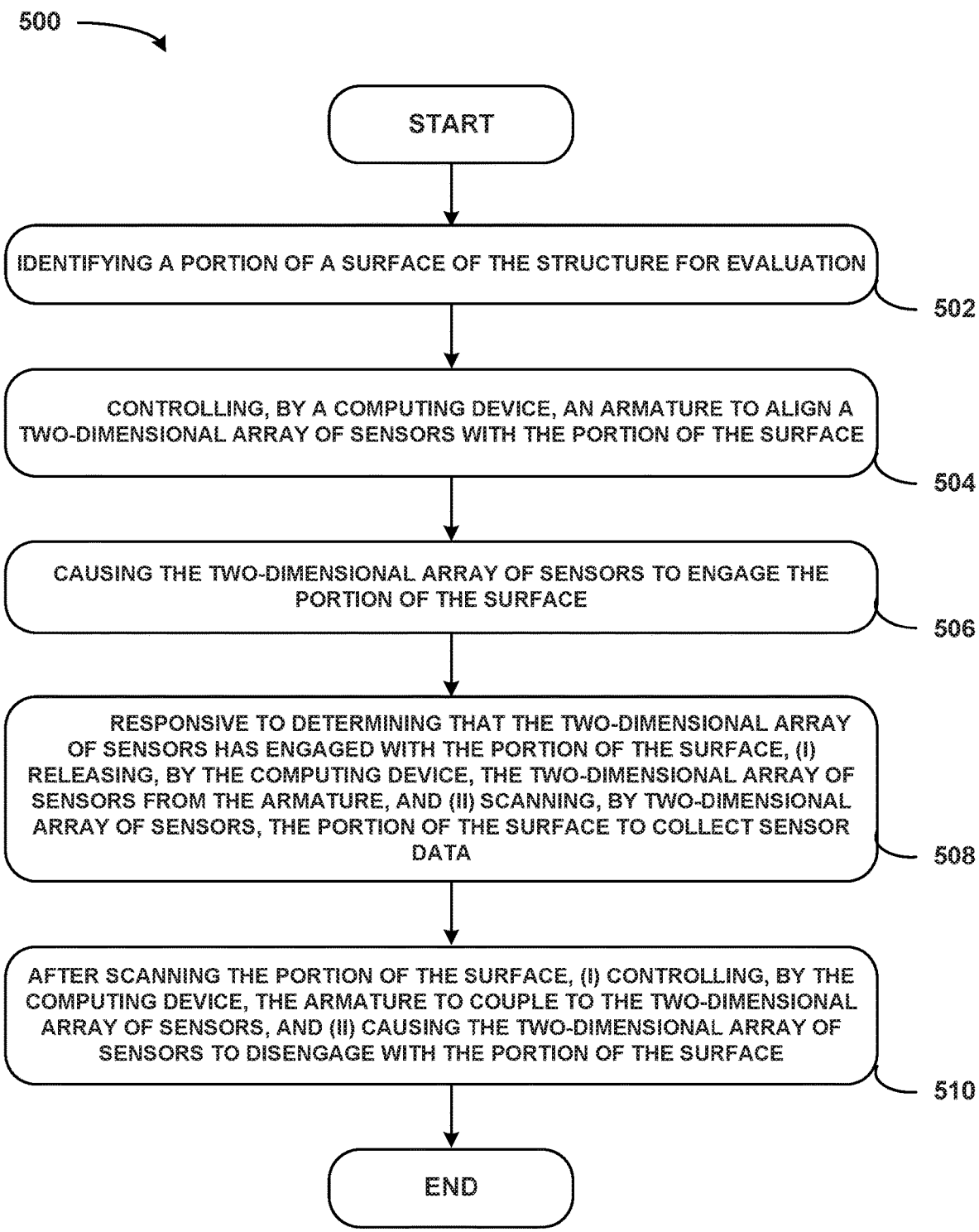
FIG. 5 shows a flowchart of a method for method for non-destructive evaluation of a structure, according to an example implementation.

FIG. 5 shows a flowchart of a method for method 500 for non-destructive evaluation of a structure, according to an example implementation. Method 500 shown in FIG. 5 presents an example of a method that could be used with the systems 100, 200, and 300 shown in FIG. 1, 2, 3A, 3B, or 3C, with components of systems 100, 200, or 300, or in conjunction with a UAV, such as UAV 202 shown in FIG. 2, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes identifying a portion of a surface 218 of the structure for evaluation. Identifying the portion of the surface 218 of the structure for evaluation can involve receiving, by the computing device 104, from the remote computing device 128, an indication of a portion of the structure to inspect and identifying a portion of the surface 218 that corresponds to the portion of structure, or automatically determining, based on an image from the image capture device 112, a portion of the surface 218 to inspect.

At block 504, the method 500 includes controlling, by the computing device 104, the armature 208 to align the two-dimensional array of sensors 214 with the portion of the surface 218. For example, the computing device 104 may use images from the image capture device 112 to guide the armature 208 to the portion of the surface 218.

At block 506, the method 500 includes causing the two-dimensional array of sensors 214 to engage the portion of the surface 218. Causing the two-dimensional array of sensors 214 to engage the portion of the surface 218 may be performed by instructing the two-dimensional array of sensors 214 to engage with the surface 218, or by causing the armature 208 to press the two-dimensional array of sensors 214 on the surface 218, whereby the two-dimensional array of sensors 214 automatically engages the surface 218. For example, the two-dimensional array of sensors 214 can include feet 428 that engage the surface 218 of the structure through suction, magnetism, electrostatic force, adhesives, friction, or another non-destructive means of temporarily coupling the two-dimensional array of sensors 214 to the surface 218 of the structure.

At block 508, the method 500 includes, responsive to determining that the two-dimensional array of sensors 214 has engaged with the portion of the surface 218, (i) releasing, by the computing device 104, the two-dimensional array of sensors 214 from the armature 208, and (ii) scanning, by two-dimensional array of sensors 214, the portion of the surface 218 to collect sensor data. Determining that the two-dimensional array of sensors 214 has engaged with the portion of the surface 218 may be determined by receiving an indication, from the two-dimensional array of sensors 214, that the two-dimensional array of sensors 214 has engaged with the surface 218. For example, one or more sensors on the two-dimensional array of sensors 214 may indicate when the two-dimensional array of sensors 214 has engaged the surface 218 of the structure. For example, pressure sensors on one or more feet 428 of the two-dimensional array of sensors may determine a normal force between the one or more feet 428 and the surface 218 that is indicative of the two-dimensional array of sensors 214 having engaged the surface 218. The computing device 104 may cause the coupling mechanism 212 of the armature 208 to release the two-dimensional array of sensors 214 upon receiving an indication from the two-dimensional array of sensors 214 that the two-dimensional array of sensors 214 has engaged the surface 218. Scanning the portion of the surface 218 of the structure to collect sensor data includes collecting data using the sensors 430 of two-dimensional array of sensors 214.

At block 510, the method 500 includes, after scanning the portion of the surface 218, (i) controlling, by the computing device 104, the armature 208 to couple to the two-dimensional array of sensors 214, and (ii) causing the two-dimensional array of sensors 214 to disengage with the portion of the surface 218. The computing device 104 may determine that the two-dimensional array of sensors 214 has completed a scan, for instance based on receiving a wireless indication from the two-dimensional array of sensors 214 that the two-dimensional array of sensors 214 has completed its scan. In response, the computing device 104 can guide the armature 208 to the two-dimensional array of sensors 214 based on a beacon signal transmitted by the two-dimensional array of sensors 214 indicating that the scan is complete, or based on images of the two-dimensional array of sensors 214 on the surface 218 captured by the image capture device 112. Causing the two-dimensional array of sensors 214 to disengage with the portion of the surface 218 can include causing the two-dimensional array of sensors 214 to automatically disengage with the surface 218 based on the coupling mechanism 212 coupling to the dorsal portion 424 of the two-dimensional array of sensors 214. In other examples, the computing device may instruct the two-dimensional array of sensors 214 to disengage after the computing device 104 detects that the coupling mechanism 212 is coupled to the dorsal portion 424 of the two-dimensional array of sensors 214. Inspecting the surface 218 in this manner may allow for efficient and non-destructive evaluation of the structure.

Figure 6:
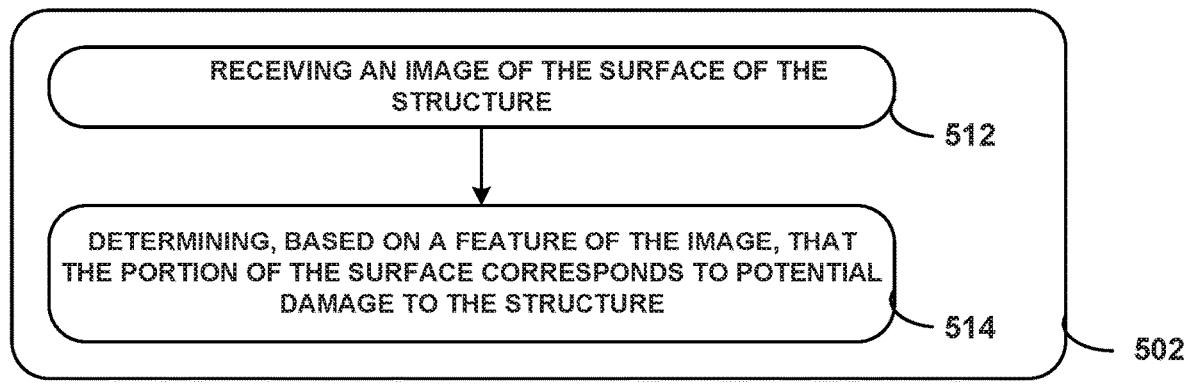
FIG. 6 shows a flowchart of another method for use with the method shown in FIG. 5, according to an example implementation.

FIG. 6 shows a flowchart of another method for use with the method shown in FIG. 5, according to an example implementation. Blocks 512 and 514 are performed in accordance with block 502. At block 512, functions include receiving an image of the surface 218 of the structure. For example, the computing device 104 may receive an image from the image capture device 112. In other examples, the remote computing device 128 may receive the image from the computing device 104. At block 514, functions include determining, based on a feature of the image, that the portion of the surface 218 corresponds to potential damage to the structure. For example the computing device 104 may send indications of the plurality of images to the remote computing device 128 and receive an instruction to inspect a particular portion of the surface 218. In particular, the remote computing device 128 may receive a selection of a portion of an image by way of the user interface 136, and forward the selection to the computing device 104. In other examples, the computing device 104 may automatically recognize signs of damage to the structure based on a feature of the image, such as a visual indication from the surface 218 as represented by the image. For example, the memory 108 of the computing device 104 may store indications of surface-level or sub-surface damage to the structure, such as known discolorations, shapes, scratches, blemishes, or other indications of surface-level or sub-surface damage. In further examples, the indications of surface-level or sub-surface damage to the structure may be stored in a database that is accessible by the computing device 104. The computing device 104 may determine that a portion of the surface 218 should be inspected based on (i) comparing a portion of an image to the stored indications of surface-level or sub-surface damage to the structure, and (ii) determine potential damage to the structure by matching the portion of the image to a stored indication of surface-level or sub-surface damage to the structure.

Figure 7:
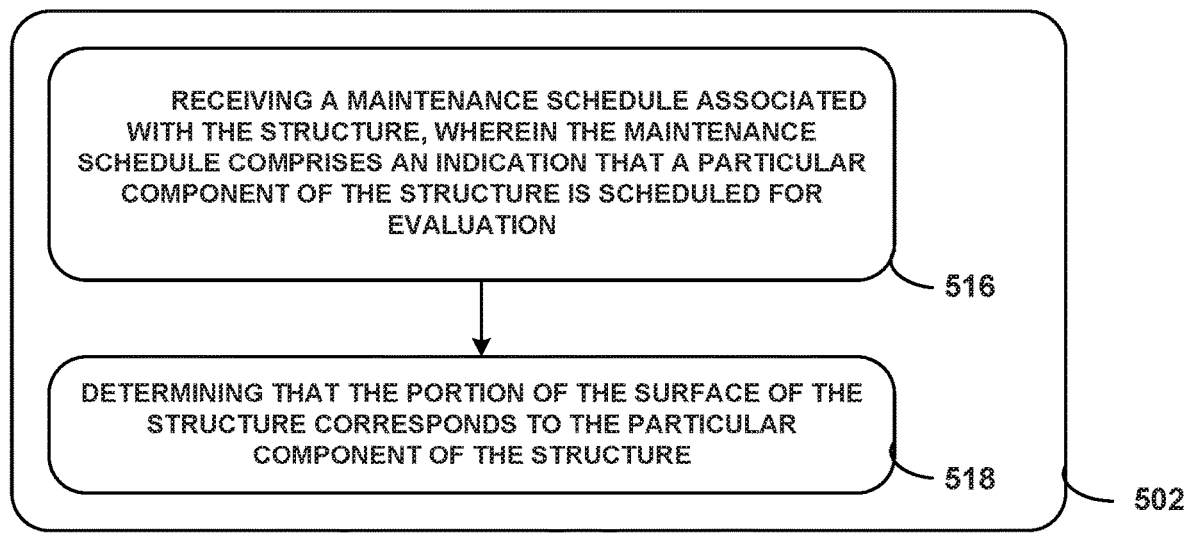
FIG. 7 shows a flowchart of another method for use with the method shown in FIG. 5, according to an example implementation.

FIG. 7 shows a flowchart of another method for use with the method shown in FIG. 5, according to an example implementation. Blocks 516 and 518 are performed in accordance with block 502. At block 516, functions include receiving a maintenance schedule associated with the structure, wherein the maintenance schedule comprises an indication that a particular component of the structure is scheduled for evaluation. The computing device 104 may receive the maintenance schedule from a remote scheduling system that governs maintenance of structures that are due for inspection for damage and components of the structures that are due for inspection for damage. At block 518, functions include determining that the portion of the surface of the structure corresponds to the particular component of the structure. For example, the computing device 104 may receive an image from the image capture device 112 and determine, from the image, a portion of the surface 218 of the structure that corresponds to the component indicated by the maintenance schedule. Within examples, the maintenance schedule governs a plurality of aircraft, and include indications that particular components of the aircraft are scheduled for maintenance. This may allow the method 500 to be integrated into an existing structural maintenance routine.

Figure 8:
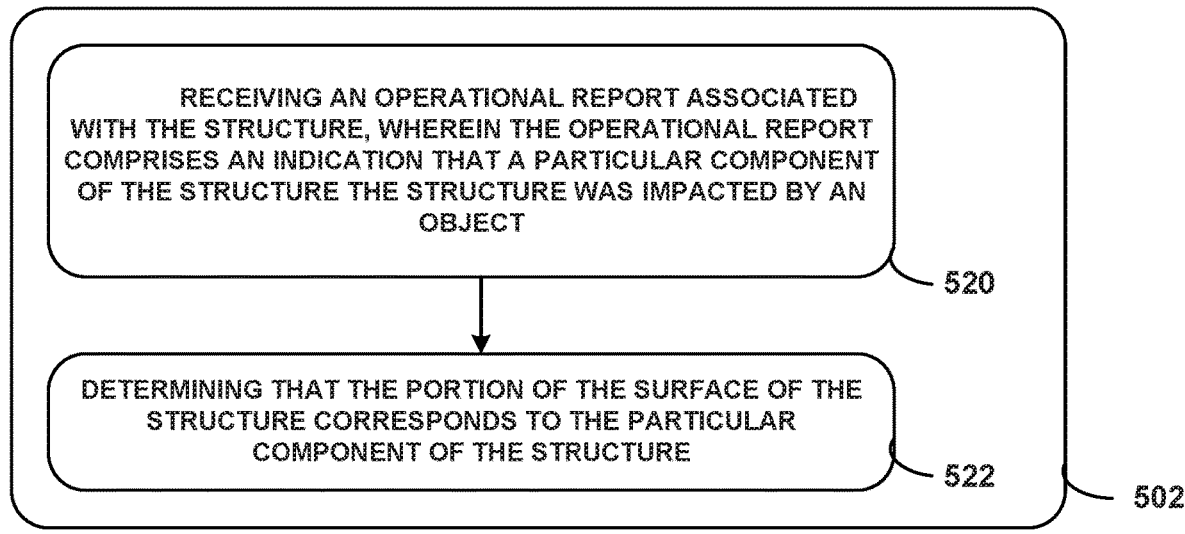
FIG. 8 shows a flowchart of another method for use with the method shown in FIG. 5, according to an example implementation.

FIG. 8 shows a flowchart of another method for use with the method shown in FIG. 5, according to an example implementation. Blocks 520 and 522 are performed in accordance with block 502. At block 520, functions include receiving an operational report associated with the structure, wherein the operational report comprises an indication that a particular component of the structure the structure was impacted by an object. The operational report may, for example, include indications of events experienced by the structure, such as maintenance, impact by objects, or failure states of one or more components. The computing device may use these indications to determine whether to inspect a component of the structure. At block 522, functions include determining that the portion of the surface 218 of the structure corresponds to the particular component of the structure. For example, the computing device 104 may receive an image from the image capture device 112 and determine, from the image, a portion of the surface 218 of the structure that corresponds to the component indicated by the operational report. This may allow for evaluation of a structure promptly after an observed event that can cause damage to the structure.

Figure 9:
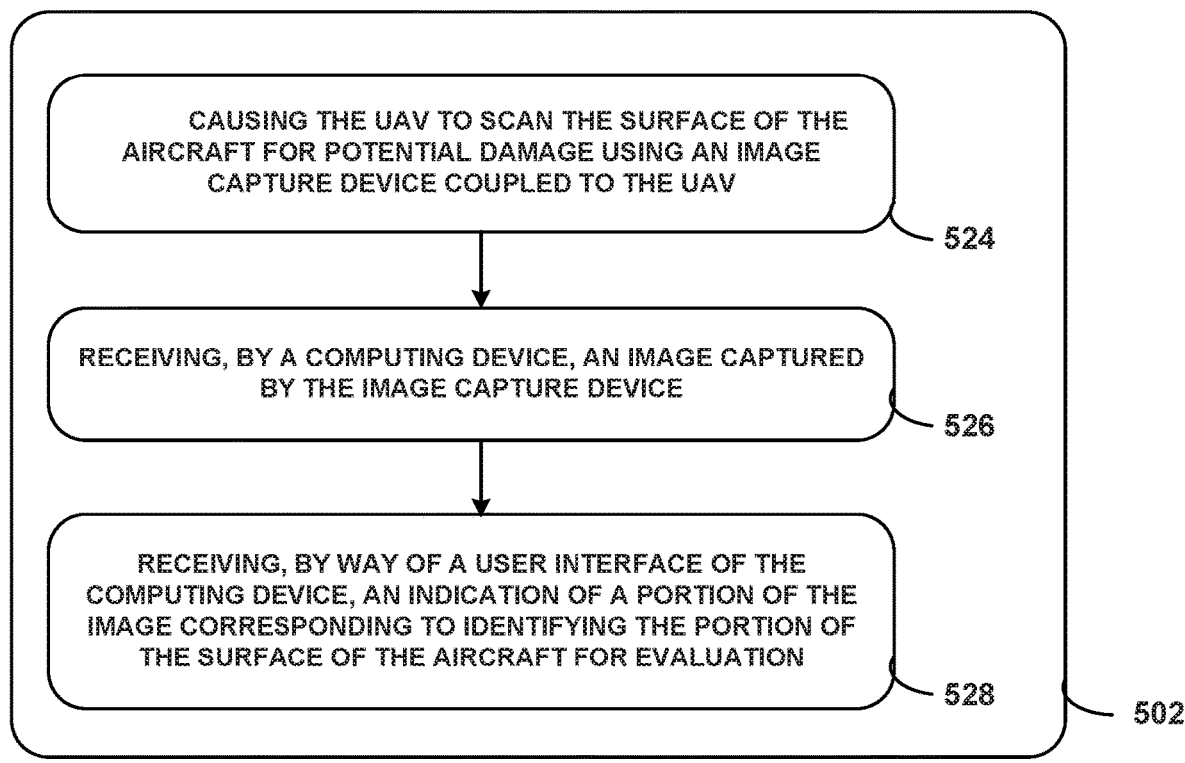
FIG. 9 shows a flowchart of another method for use with the method shown in FIG. 5, according to an example implementation.

FIG. 9 shows a flowchart of another method for use with the method shown in FIG. 5, according to an example implementation. In particular, FIG. 9 corresponds to an embodiment wherein the armature 208 is coupled to a UAV 202, wherein the structure is an aircraft. Blocks 524, 536, and 528 are performed in accordance with block 502. At block 524, functions include causing the UAV 202 to scan the surface of the aircraft for potential damage using the image capture device 112 coupled to the UAV 202. At block 526, functions include receiving, by the remote computing device 128, an image captured by the image capture device 112. For example, the computing device 104 may transmit the image, or a representation of the image, to the remote computing device 128. At block 528, functions include receiving, by way of a user interface 136 of the remote computing device 128, an indication of a portion of the image corresponding to identifying the portion of the surface of the aircraft for evaluation. In particular, a user may select a portion of the image displayed on the user interface 136, and the remote computing device 128, and the remote computing device 128 may send an indication of the selection to the computing device 104. This may allow a user to interact with the computing device 104 in real time to evaluate the structure for damage.

Figure 10:
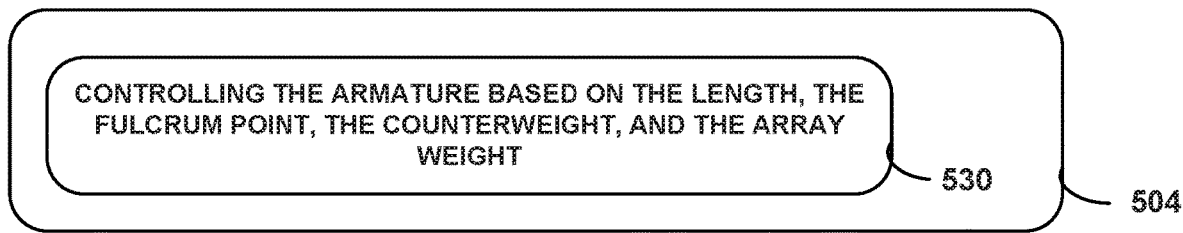
FIG. 10 shows a flowchart of another method for use with the method shown in FIG. 5, according to an example implementation.

FIG. 10 shows a flowchart of another method for use with the method shown in FIG. 5, according to an example implementation. In particular, FIG. 10 corresponds to an embodiment wherein the armature 208 is coupled to the UAV 202, wherein the armature 208 comprises a length, a fulcrum point along the length, and a counterweight 216, and wherein the two-dimensional array of sensors 214 has an array weight. Block 530 is performed in accordance with block 504. At block 530, functions include controlling the armature 208 based on the length, the fulcrum point, the counterweight 216, and the array weight. For example, each of these factors can be used to determine a torque to apply to the armature 208 at the fulcrum 210 when aligning the two-dimensional array of sensors 214 with the portion of the surface 218.

Figure 11:
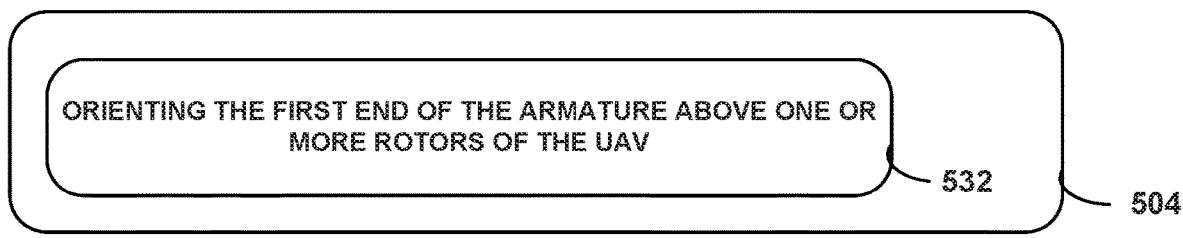
FIG. 11 shows a flowchart of another method for use with the method shown in FIG. 5, according to an example implementation.

FIG. 11 shows a flowchart of another method for use with the method shown in FIG. 5, according to an example implementation. In particular, FIG. 11 corresponds to an embodiment wherein the armature 208 comprises a first end coupled to the two-dimensional array of sensors 214, wherein the armature 208 is coupled to a UAV 202. Block 532 is performed in accordance with block 504. At block 532, functions include orienting the first end of the armature above one or more rotors of the UAV. For example, as depicted in FIGS. 3A and 3B, the computing device 104 can guide the armature 208 through the slot 220 in the fuselage 204 of the UAV 202 so that the two-dimensional array of sensors 214 is disposed above the rotors 206. Configuring the UAV 302 and the armature 208 in this manner may allow for more adaptive use of the two-dimensional array of sensors 214 and reduce the need for manual inspection of certain portions of the structure.

Figure 12:
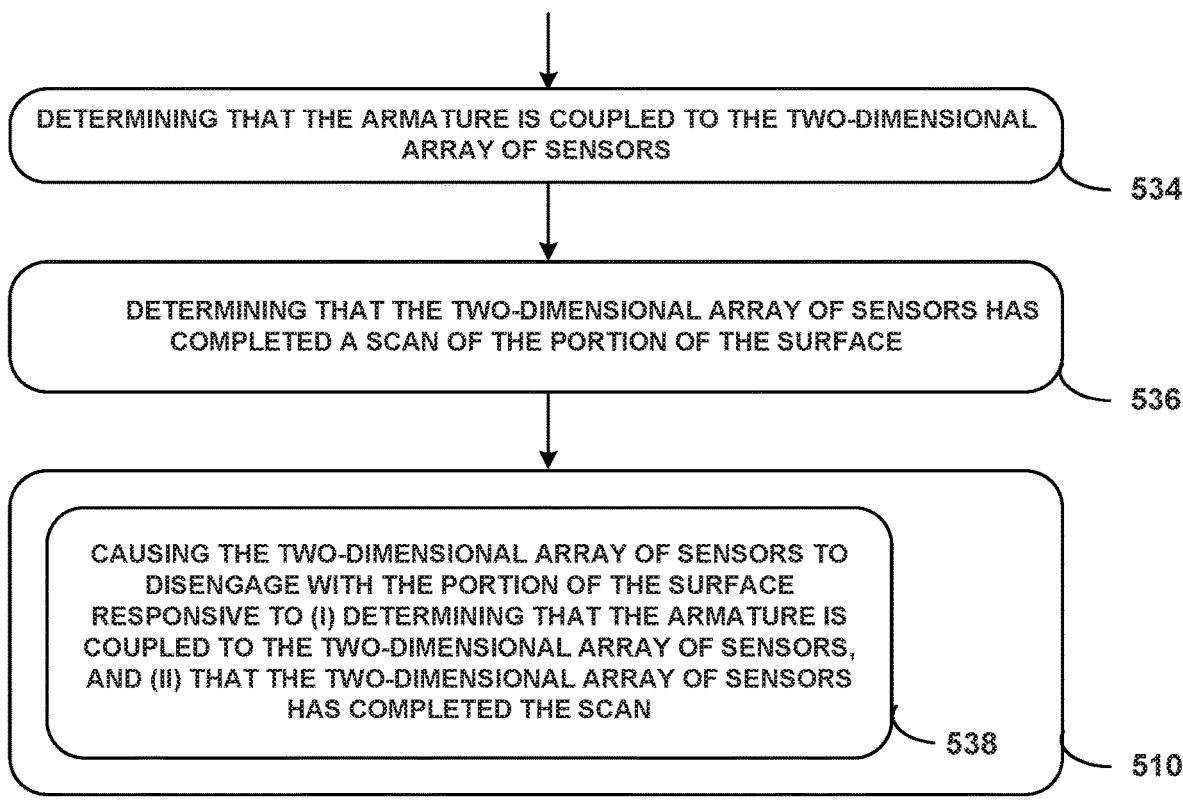
FIG. 12 shows a flowchart of another method for use with the method shown in FIG. 5, according to an example implementation.

FIG. 12 shows a flowchart of another method for use with the method shown in FIG. 5, according to an example implementation. At block 534, functions include determining that the armature 208 is coupled to the two-dimensional array of sensors 214. For example, the computing device 104 may determine that the 208 is coupled to the two-dimensional array of sensors 214 using a coupling sensor on the coupling mechanism 212 or on the dorsal portion 224 of the two-dimensional array of sensors 214. At block 236, functions include determining that the two-dimensional array of sensors 214 has completed a scan of the portion of the surface. For example, For example, the computing device 104 can determine this based on a beacon signal transmitted by the two-dimensional array of sensors 214 indicating that the scan is complete. In other examples, the computing device 104 can determine that the scan is complete based on a time difference between the armature 208 releasing the two-dimensional array of sensors 214 and a current time being greater than a threshold time. In such examples, the threshold time may be a known time (e.g. 10 seconds) associated with the two-dimensional array of sensors 214 performing a single scan of the portion of the surface 218 of the structure. In other examples, the threshold time may be predetermined based on an evaluation schedule of the structure that sets predetermined times for inspecting each of a plurality of portions of the surface 218 of the structure.

Block 538 is performed in accordance with block 510. At block 538, functions include causing the two-dimensional array of sensors 214 to disengage with the portion of the surface responsive to (i) determining that the armature 208 is coupled to the two-dimensional array of sensors 214, and (ii) that the two-dimensional array of sensors 214 has completed the scan. For example, after determining that the two-dimensional array of sensors 214 has completed the scan of the portion of the surface 218, the computing device 104 can cause the armature 208 to retrieve the two-dimensional array of sensors 214. The computing device 104 may determine that the two-dimensional array of sensors 214 an the armature 208 are coupled based on a coupling sensor on the two-dimensional array of sensors 214 or on the armature 208 detecting that the two-dimensional array of sensors 214 and the armature 208 are coupled.

Figure 13:
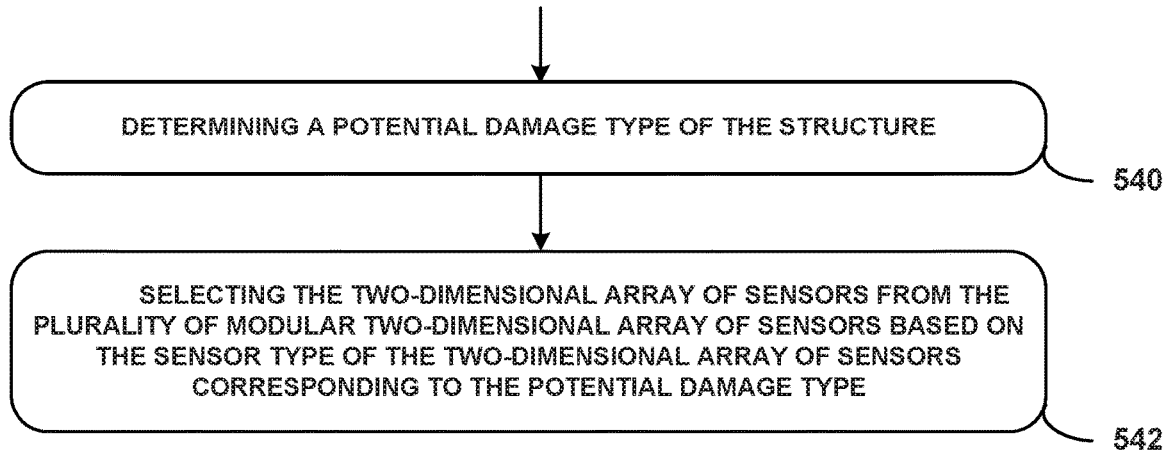
FIG. 13 shows a flowchart of another method for use with the method shown in FIG. 5, according to an example implementation.

FIG. 13 shows a flowchart of another method for use with the method shown in FIG. 5, according to an example implementation. In particular, FIG. 13 corresponds to an embodiment wherein the two-dimensional array of sensors 214 is one of a plurality of modular two-dimensional array of sensors, wherein each two-dimensional array of sensors of the plurality of modular two-dimensional array of sensors comprises a sensor type. For example, different modular two-dimensional arrays of sensors can respectively have sensors configured to perform an ultrasound scan, eddy current scan, thermography scan, low frequency sound scan, or another type of scan of the surface 218 of the structure.

At block 540, functions include determining a potential damage type of the structure. For example, the computing device 104 may determine a potential damage type of the structure based on a feature of an image received from the image capture device 112. For example, a particular pattern of discoloration on the surface 218 of the structure may indicate that the structure has been impacted by an object, and may be associated with sub-surface damage. Accordingly, the computing device 104 may select a two-dimensional array of sensors 214 corresponding to that potential damage type. For example, the computing device 104 may select a two-dimensional array of ultrasound sensors. Further, the image capture device 112 may include more than one type of camera. For instance, the image capture device 112 may include a first camera configured for capturing images in the visible spectrum and a second camera configured for capturing images outside of the visible spectrum (e.g. an infrared (IR) camera). The computing device 104 might determine a potential type of damage based at least in part on what type of image capture device captured an image. For instance, damage detected from an IR image may indicate sub-surface damage, while damage detected from a visible spectrum image may indicate surface-level damage.

At block 542, functions include selecting the two-dimensional array of sensors 214 from the plurality of modular two-dimensional array of sensors based on the sensor type of the two-dimensional array of sensors corresponding to the potential damage type. For example, different modular two-dimensional arrays of sensors can respectively have sensors configured to perform an ultrasound scan, eddy current scan, thermography scan, low frequency sound scan, or another type of scan of the surface 218 of the structure. Each of these may be associated with one or more damage types.

Figure 14:
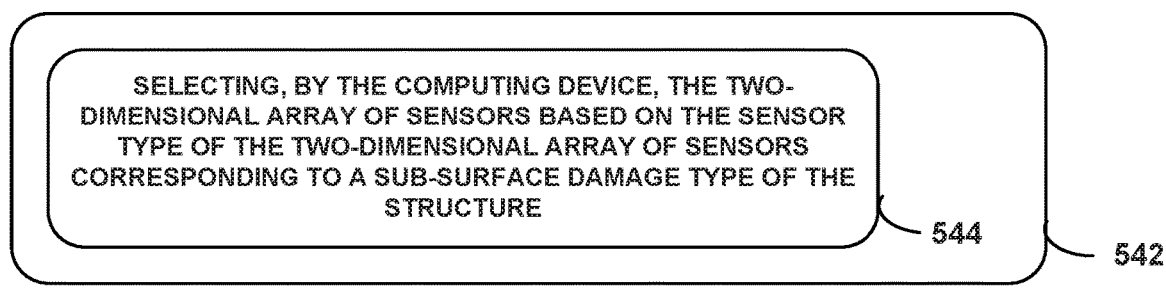
FIG. 14 shows a flowchart of another method for use with the methods shown in FIG. 5 and FIG. 13, according to an example implementation.

FIG. 14 shows a flowchart of another method for use with the methods shown in FIG. 5 and FIG. 13, according to an example implementation. In particular, FIG. 14 corresponds to an embodiment wherein determining the potential damage type to the structure comprises receiving an IR image of the surface 218 of the structure, wherein the IR image of the surface of the structure indicates potential damage beneath the surface 218 of the structure. Block 544 is performed in accordance with block 542. At block 544, functions include selecting, by the computing device 104, the two-dimensional array of sensors 214 based on the sensor type of the two-dimensional array of sensors 214 corresponding to a sub-surface damage type of the structure. For example, the computing device 104 may select a two-dimensional array of ultrasound sensors.

Figure 15:
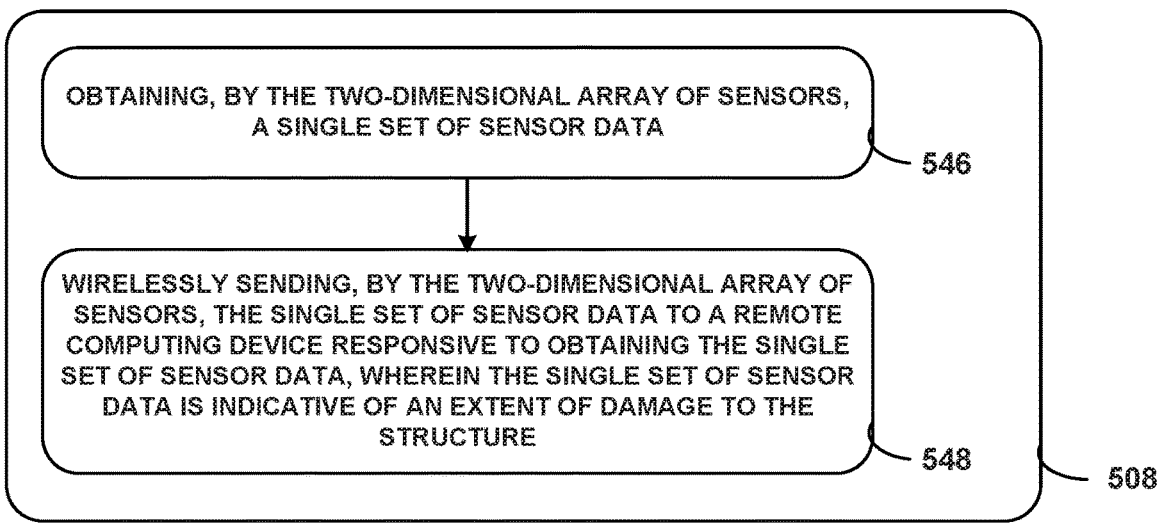
FIG. 15 shows a flowchart of another method for use with the method shown in FIG. 5, according to an example implementation.

FIG. 15 shows a flowchart of another method for use with the method shown in FIG. 5, according to an example implementation. Blocks 546 and 548 are performed in accordance with block 508. At block 546, functions include obtaining, by the two-dimensional array of sensors 214, a single set of sensor data. At block 548, functions include wirelessly sending, by the two-dimensional array of sensors 214, the single set of sensor data to a remote computing device 128 responsive to obtaining the single set of sensor data, wherein the single set of sensor data is indicative of an extent of damage to the structure. Obtaining and sending a single set of data for each selected portion of the structure may allow for evaluation of the structure to be performed more quickly.

Within the examples described herein, non-destructive systems and methods can be implemented to streamline inspection and evaluation of a structure. Use of an armature control system to selectively place a two-dimensional array of sensors on the structure allows fast inspections, while use of modular arrays of different types of sensors allows for adaptive and robust evaluation of the structure. In addition, implementing these systems and methods using a UAV can allow for automatic or user-controlled inspections of a structure, such as an aircraft, in real time without the need for human interaction with sensory equipment.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for non-destructive evaluation of a structure, the method comprising:
   identifying a portion of a surface of the structure for evaluation;
   controlling, by a computing device, an armature to align a two-dimensional array of sensors with the portion of the surface, wherein the armature is coupled to an unmanned aerial vehicle (UAV), wherein the armature comprises a length, a fulcrum point along the length, and a counterweight, wherein the two-dimensional array of sensors has an array weight, and wherein controlling the armature to align the two-dimensional array of sensors with the portion of the surface comprises controlling the armature based on the length, the fulcrum point, the counterweight, and the array weight;
   causing the two-dimensional array of sensors to engage the portion of the surface;
   responsive to determining that the two-dimensional array of sensors has engaged with the portion of the surface,
      (i) releasing, by the computing device, the two-dimensional array of sensors from the armature, and
      (ii) scanning, by two-dimensional array of sensors, the portion of the surface to collect sensor data; and
   after scanning the portion of the surface, (i) controlling, by the computing device, the armature to couple to the two-dimensional array of sensors, and (ii) causing the two-dimensional array of sensors to disengage with the portion of the surface.

2. The method of claim 1, wherein identifying the portion of the surface of the structure for evaluation comprises:
   receiving an image of the surface of the structure; and
   determining, based on a feature of the image, that the portion of the surface corresponds to potential damage to the structure.

3. The method of claim 1, wherein identifying the portion of the surface of the structure for evaluation comprises:
   receiving a maintenance schedule associated with the structure, wherein the maintenance schedule comprises an indication that a particular component of the structure is scheduled for evaluation; and
   determining that the portion of the surface of the structure corresponds to the particular component of the structure.

4. The method of claim 1, wherein identifying the portion of the surface of the structure for evaluation comprises:
   receiving an operational report associated with the structure, wherein the operational report comprises an indication that a particular component of the structure the structure was impacted by an object; and
   determining that the portion of the surface of the structure corresponds to the particular component of the structure.

5. The method of claim 1, wherein the structure is an aircraft, and wherein identifying the portion of the surface of the structure for evaluation comprises:
   causing the UAV to scan the surface of the aircraft for potential damage using an image capture device coupled to the UAV;
   receiving, by a remote computing device, an image captured by the image capture device; and
   receiving, by way of a user interface of the remote computing device, an indication of a portion of the image corresponding to identifying the portion of the surface of the aircraft for evaluation.

6. The method of claim 1, wherein the armature comprises a first end coupled to the two-dimensional array of sensors, wherein the armature is coupled to an unmanned aerial vehicle (UAV), and wherein controlling the armature to align the two-dimensional array of sensors with the portion of the surface comprises orienting the first end of the armature above one or more rotors of the UAV.

7. The method of claim 1, further comprising:
   determining that the armature is coupled to the two-dimensional array of sensors; and
   determining that the two-dimensional array of sensors has completed a scan of the portion of the surface,
   wherein causing the two-dimensional array of sensors to disengage with the portion of the surface comprises causing the two-dimensional array of sensors to disengage with the portion of the surface responsive to (i) determining that the armature is coupled to the two-dimensional array of sensors, and (ii) that the two-dimensional array of sensors has completed the scan.

8. The method of claim 1, wherein the two-dimensional array of sensors is one of a plurality of modular two-dimensional arrays of sensors, wherein each two-dimensional array of sensors of the plurality of modular two-dimensional arrays of sensors comprises a sensor type, the method further comprising:
   determining a potential damage type of the structure; and
   selecting the two-dimensional array of sensors from the plurality of modular two-dimensional array of sensors based on the sensor type of the two-dimensional array of sensors corresponding to the potential damage type.

9. The method of claim 8, wherein determining the potential damage type to the structure comprises receiving an infrared (IR) image of the surface of the structure, wherein the IR image of the surface of the structure indicates potential damage beneath the surface of the structure, and wherein selecting the two-dimensional array of sensors based on the sensor type of the two-dimensional array of sensors corresponding to the potential damage type comprises selecting, by the computing device, the two-dimensional array of sensors based on the sensor type of the two-dimensional array of sensors corresponding to a sub-surface damage type of the structure.

10. The method of claim 1, wherein scanning, by the two-dimensional array of sensors, the portion of the surface comprises:
   obtaining, by the two-dimensional array of sensors, a single set of sensor data; and
   wirelessly sending, by the two-dimensional array of sensors, the single set of sensor data to a remote computing device responsive to obtaining the single set of sensor data, wherein the single set of sensor data is indicative of an extent of damage to the structure.

11. A system for non-destructive evaluation of a structure, the system comprising:
- a two-dimensional array of sensors;
- an unmanned aerial vehicle (UAV);
- an armature coupled to the UAV, wherein the armature comprises a first end coupled to the two-dimensional array of sensors via a male-to-female connection, wherein the first end of the armature comprises a female component of the male-to-female connection, and wherein a dorsal portion of the two-dimensional array of sensors comprises a male component of the male-to-female connection; and
- a computing device having a processor and memory storing instructions executable by the processor to:
  - identify a portion of a surface of the structure for evaluation;
  - control the armature to align the two-dimensional array of sensors with the portion of the surface;
  - cause the two-dimensional array of sensors to engage the portion of the surface;
  - responsive to determining that the two-dimensional array of sensors has engaged with the portion of the surface,
    - (i) release the two-dimensional array of sensors from the armature, and
    - (ii) cause the two-dimensional array of sensors to scan the portion of the surface to collect sensor data; and
  - after causing the two-dimensional array of sensors to scan the portion of the surface, (i) control the armature to couple to the two-dimensional array of sensors, and (ii) cause the two-dimensional array of sensors to disengage with the portion of the surface.

12. The system of claim 11, wherein the female component of the male-to-female connection comprises a coupling sensor configured to detect whether the male component is coupled to the female component, and wherein determining that the two-dimensional array of sensors has engaged with the portion of the surface comprises detecting, by the coupling sensor, that the male component is not coupled to the female component.

13. The system of claim 11, wherein the male component is coupled to the female component via a vacuum-controlled mechanism.

14. The system of claim 11, wherein the UAV is associated with the computing device, the system further comprising an image capture device coupled to the UAV, wherein identifying the portion of the surface of the structure for evaluation comprises:
- receiving an image of the surface of the structure; and
- determining, based on a feature of the image, that the portion of the surface corresponds to potential damage to the structure.

15. The system of claim 11, wherein the UAV is associated with the computing device, wherein the UAV comprises:
- a first rotor and a second rotor, wherein a rotor distance separates an outer portion of the first rotor and an outer portion of the second rotor, and wherein the rotor distance is wider than a diameter of the armature; and
- a fuselage disposed below the first rotor and the second rotor, wherein the fuselage is coupled to the armature, and wherein the fuselage comprises a slot wider than the diameter of the armature.

16. The system of claim 15, wherein the armature comprises a first end coupled to the two-dimensional array of sensors, and wherein controlling the armature to align the two-dimensional array of sensors with the portion of the surface comprises orienting a portion of the armature through the slot of the fuselage, between the first rotor and the second rotor, and orienting the first end of the armature above the first rotor and the second rotor.

17. The system of claim 11, wherein the computing device is a first computing device, the system further comprising further comprising a second computing device having a processor and memory storing instructions executable by the processor to:
- receive the sensor data from the two-dimensional array of sensors; and
- based on the sensor data, determine an extent of damage to the structure.

18. A non-transitory computer readable medium having stored thereon instructions, that when executed by one or more processors of a computing device, cause the computing device to perform functions comprising:
- identifying a portion of a surface of a structure for evaluation;
- determining a potential damage type of the structure;
- selecting a two-dimensional array of sensors from a plurality of modular two-dimensional array of sensors, wherein each two-dimensional array of sensors of the plurality of modular two-dimensional arrays of sensors comprises a sensor type, and wherein selecting the two-dimensional array comprises selecting the two-dimensional array based on the sensor type of the two-dimensional array of sensors corresponding to the potential damage type;
- controlling an armature to align the two-dimensional array of sensors with the portion of the surface;
- causing the two-dimensional array of sensors to engage the portion of the surface;
- responsive to determining that the two-dimensional array of sensors has engaged with the portion of the surface,
  - (i) releasing the two-dimensional array of sensors from the armature, and
  - (ii) causing the two-dimensional array of sensors to scan the portion of the surface to collect sensor data; and
- after causing the two-dimensional array of sensors to scan the portion of the surface, (i) controlling the armature to couple to the two-dimensional array of sensors, and (ii) causing the two-dimensional array of sensors to disengage with the portion of the surface.

19. The non-transitory computer readable medium of claim 18, wherein determining the potential damage type to the structure comprises receiving an infrared (IR) image of the surface of the structure, wherein the IR image of the surface of the structure indicates potential damage beneath the surface of the structure, and wherein selecting the two-dimensional array of sensors based on the sensor type of the two-dimensional array of sensors corresponding to the potential damage type comprises selecting, by the computing device, the two-dimensional array of sensors based on the sensor type of the two-dimensional array of sensors corresponding to a sub-surface damage type of the structure.

20. The non-transitory computer readable medium of claim 18, wherein the armature comprises a first end coupled to the two-dimensional array of sensors, wherein the armature is coupled to an unmanned aerial vehicle (UAV), and wherein controlling the armature to align the two-dimensional array of sensors with the portion of the surface comprises orienting the first end of the armature above one or more rotors of the UAV.

* * * * *